(12) United States Patent
McDonnell (10) Patent No.: US 10,148,731 B2
(45) Date of Patent: Dec. 4, 2018

(54) METHODS, SYSTEMS, AND COMPUTER READABLE MEDIA FOR ON-BOARDING VIRTUALIZED NETWORK FUNCTION (VNF) PACKAGES IN A NETWORK FUNCTIONS VIRTUALIZATION (NFV) SYSTEM

(71) Applicant: Oracle International Corporation, Redwood Shores, CA (US)

(72) Inventor: Kevin James McDonnell, Delgany (IE)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 204 days.

(21) Appl. No.: 14/788,133

(22) Filed: Jun. 30, 2015

(65) Prior Publication Data
US 2017/0006083 A1    Jan. 5, 2017

(51) Int. Cl.
*H04L 29/08* (2006.01)
*H04L 12/24* (2006.01)

(52) U.S. Cl.
CPC .............. *H04L 67/06* (2013.01); *H04L 41/12* (2013.01); *H04L 67/1097* (2013.01)

(58) Field of Classification Search
CPC ..... H04L 41/12; H04L 67/06; H04L 67/1097; H04L 41/0893; H04L 69/03; H04L 12/46; G06F 9/5077
See application file for complete search history.

(56) References Cited

U.S. PATENT DOCUMENTS

| | | | | |
|---|---|---|---|---|
| 6,675,382 B1* | 1/2004 | Foster | ...................... | G06F 8/61 707/999.001 |
| 8,490,082 B2* | 7/2013 | Moore | ...................... | G06F 8/60 717/120 |
| 9,774,541 B1* | 9/2017 | Herzog | ................... | H04L 47/78 |
| 2011/0239214 A1* | 9/2011 | Frields | ................ | G06F 9/45533 718/1 |
| 2015/0180730 A1* | 6/2015 | Felstaine | ............... | H04L 41/022 709/225 |

(Continued)

OTHER PUBLICATIONS

European Telecommunications Standards Institute (ETSI) Group Specification (GS) Network Functions Virtualisation (NFV) Management and Orchestration, ETSI GS NFV-MAN 001 V1.1.1 (Dec. 2014).*

(Continued)

*Primary Examiner* — Kamal B Divecha
*Assistant Examiner* — Sandarva Khanal
(74) *Attorney, Agent, or Firm* — Jenkins, Wilson, Taylor and Hunt, P.A.

(57) ABSTRACT

The disclosed subject matter describes herein a method for on-boarding virtualized network function (VNF) packages in a network functions virtualization (NFV) system that includes receiving a VNF package archive (VPAR) file containing a VNF package and accessing a VNF descriptor (VNFD) file in a VNFD directory contained within the VPAR file. The method further includes uploading the VNFD file from the VNFD directory to a VNF catalog in the NFV system and deploying, in a virtual environment associated with the NFV system, one or more VNFs in accordance to the contents of the uploaded VNFD file and an associated VNF image file.

20 Claims, 4 Drawing Sheets

(56) References Cited

U.S. PATENT DOCUMENTS

2016/0359805 A1* 12/2016 Spraggs .............. H04L 61/2517

OTHER PUBLICATIONS

Oracle web publication titled "jar—The Java Archive Tool", Published on Dec. 4, 2013.*
Oracle web publication titled "Using JAR Files: The Basics", Published on Dec. 4, 2013.*
PKWARE Inc. web publication titled ".ZIP File Format Specification", Published on Oct. 1, 2014.*
OpenStack Virtual Machine Image Guide, published on Sep. 13, 2014.*
Liu et al. (IBM developerWorks publication titled "Create Linux and Windows images for OpenStack private clouds: A new method for OpenStack image construction"), published on Jan. 13, 2014.*
European Telecommunications Standards Institute (ETSI) Group Specification (GS) Network Functions Virtualisation (NFV); Management and Orchestration, ETSI GS NFV-MAN 001 V1.1.1 (Dec. 2014), European Telecommunications Standards Institute 2014. (Year: 2014).*
Xilouris, "Initial VNFD for example VNF comprising two VNFCs", Jun. 19, 2015. GitHub. (Year: 2015).*
Oracle web publication titled "jar—The Java Archive Tool", Dec. 4, 2013. (Year: 2013).*
Oracle web publication titled "Using JAR Files: The Basics", Dec. 4, 2013. (Year: 2013).*
Qlik Community (Discussion Forum), "External script files—upload via Repository Service API", Jun. 10, 2015. Retrieved from URL https://community.qlik.com/thread/167678 on Jul. 10, 2018. (Year: 2015).*
Tom Nolle, CIMI Corp. "If Management is the Key to NFV, Where is the VNFM?" Nov. 18, 2014. Retrieved from URL http://blog.cimicorp.com/?p=1958 on Jul. 10, 2018. (Year: 2014).*
"Network Functions Virtualisation (NFV); Management and Orchestration," ETSI Group Specification, GS NFV-MAN 001 V1.1.1, pp. 1-184 (Dec. 2014).

* cited by examiner

METHODS, SYSTEMS, AND COMPUTER READABLE MEDIA FOR ON-BOARDING VIRTUALIZED NETWORK FUNCTION (VNF) PACKAGES IN A NETWORK FUNCTIONS VIRTUALIZATION (NFV) SYSTEM

TECHNICAL FIELD

The subject matter described herein relates to the management and orchestration of virtualized network functions (VNFs). More particularly, the subject matter described herein relates to methods, systems, and computer readable media for on-boarding VNF packages in a network function virtualization system utilizing a predefined format.

BACKGROUND

In order for virtualized network functions (VNFs) to be provisioned in a virtualized environment, multiple systems are utilized to facilitate the deployment. For example, a virtualized environment may include a management and orchestration (MANO) system stack that includes subsystems such as a network function virtualization orchestrator (NFVO), a virtualized network function manager (VNFM), and a virtualized infrastructure manager (VIM). Notably, the European Telecommunications Standards Institute (ETSI) network functions virtualization (NFV) industry specification group (ISG) has defined a reference architecture for the management and orchestration of a network of VNFs. In particular, the utilization of "VNF packages" enables this process. While not explicitly defined, a VNF package generally comprises one or more VNF descriptors and one or more VNF image files that may be used to deploy a VNF in a virtual environment. Similarly, ETSI generally describes a VNF package as an archive containing a VNF descriptor (VNFD) file, virtual machine software image(s) associated with the VNF, and any additional artifacts (e.g., which are used to check the integrity and to prove the validity of the archive). In general, a VNF package contains all of the components required to on-board and orchestrate a VNF in a virtualized environment using an ETSI NFV ISG defined "MANO" system stack. However, at present, there is no formally agreed standard existing for the VNFD itself, which makes on-boarding of a VNF package an inefficient process.

Accordingly, there exists a need for methods, systems, and computer readable media for on-boarding VNF packages in an NFV system utilizing a predefined format.

SUMMARY

Methods, systems, and computer readable media for on-boarding VNF packages are disclosed. According to one aspect, the subject matter described herein includes a method that includes receiving a VNF package archive (VPAR) file containing a VNF package and accessing a VNFD file in a VNFD directory contained within the VPAR file. The method further includes uploading the VNFD file from the VNFD directory to a VNF catalog in the NFV system and deploying, in a virtual environment associated with the NFV system, one or more VNFs in accordance to the contents of the uploaded VNFD file and an associated VNF image file.

In some embodiments, the disclosed subject matter includes a system comprising a NFVO that includes a VNF package management system configured to receive a VPAR file containing a VNF package, to access a VNFD file in a VNFD directory contained within the VPAR file, and to upload the VNFD file from the VNFD directory to a VNF catalog in the NFV system. The system further includes a VIM configured to deploy, in a virtual environment associated with the NFV system, one or more VNFs in accordance to the contents of the uploaded VNFD file and an associated VNF image.

In some embodiments, the disclosed subject matter includes a non-transitory computer readable medium having stored thereon executable instructions that when executed by the processor of a computer cause the computer to perform steps comprising receiving a VPAR file containing a VNF package, accessing a VNFD file in a VNFD directory contained within the VPAR file, uploading the VNFD file from the VNFD directory to a VNF catalog in the NFV system, and deploying, in a virtual environment associated with the NFV system, one or more VNFs in accordance to the contents of the uploaded VNFD file and an associated VNF image file.

The subject matter described herein may be implemented in hardware, software, firmware, or any combination thereof. As such, the terms "function" or "module" as used herein refer to hardware, which may also include software and/or firmware components, for implementing the feature being described. In one exemplary implementation, the subject matter described herein may be implemented using a non-transitory computer readable medium having stored thereon computer executable instructions that when executed by the processor of a computer control the computer to perform steps. Exemplary computer readable media suitable for implementing the subject matter described herein include non-transitory computer-readable media, such as disk memory devices, chip memory devices, programmable logic devices, and application specific integrated circuits. In addition, a computer readable medium that implements the subject matter described herein may be located on a single device or computing platform or may be distributed across multiple devices or computing platforms.

BRIEF DESCRIPTION OF THE DRAWINGS

The subject matter described herein will now be explained with reference to the accompanying drawings of which.

DETAILED DESCRIPTION

The subject matter described herein relates to methods, systems, and computer readable media for on-boarding VNF packages in a NFV system utilizing a predefined format. As used herein, NFV is a network architecture concept that utilizes IT virtualization related technologies to virtualize entire classes of network node functions into building blocks (i.e., VNFs) that may be logically connected to create communication services. In some embodiments, the VNF package to be on-boarded (e.g., imported and/or provisioned) into a NFV system contains VNF descriptor metadata and VNF image files in a predefined format. For example, the predefined format may include a VPAR file and organized in such a manner that the VNF package may be useable by multiple NFV systems. Notably, the VNF package contained in the VPAR file may be updated over time and maintained similar to other archive structures, such as ZIP archives.

In some embodiments, the VPAR file is designed to contain a VNF package which serves to provide data to various processing management systems in the NFV environment with respect to the functionality, structure, and delivery system of one or more VNFs contained in the VPAR file. In some embodiments, a VNF may include an image file containing one or more virtual machines configured to run different software and processes on top of high volume servers, switch and storage (or even cloud computing infrastructure) instead of having custom hardware appliances for each network function.

Notably, the structure of the VPAR file serves to assist in the location of the VFND files within the VNF package itself. The ingestion (e.g., parsing) of the VNFD templates or specifications is based on the processing of the format used to model the VNF descriptor. In some embodiments, the formal package structure afforded by the VPAR file enables the automation of the VNF lifecycle without the need for special coding or manual intervention for basic VNF package processing and management. The formal package structure of the VPAR file also allows for a VNF package to be processed on a per folder (or directory) basis without requiring a full zip file to be extracted and processed. Further, the VPAR file provides a generic VNF package format by providing a portable archive that can be deployed to various management and organization system stacks since the VPAR file does not adhere to a specific VNFD template or format. However, the directory structure within the VPAR file allows for consistency of processing without mandating a particular VNFD implementation, such as TOSCA's Node Template, YANG format, a proprietary XML file format, or the like.

In some embodiments, the VPAR file is directed to an archive for organizing a complete VNF package such that the VNF package can be registered and/or on-boarded (e.g., uploaded and/or imported) to various subsystems within the NFV system for processing. As used herein, VNF on-boarding refers to the process of submitting a VNF package to a NFVO such that one or more VNFs contained in the VNF package included in the VPAR file are uploaded by the NFVO to a data repository, such as a VNF catalog or Network Function store, for further processing. For example, VNFD files may be uploaded to a VNF catalog in the NFV system while VNF image files included in an images directory in the VPAR file may be uploaded to an images repository in the NFV system.

In some embodiments, a VNF Package Management System located within a NFVO subsystem of the NFV-MANO system (e.g., a system stack) may be configured to register the contents of the VNF package included in a VPAR file in a secure and repeatable process. Further, the VPAR file structure may in some instances leverage a Java Archive format by integrating a zipped directory structure of assorted files that comprises a VNF package. In addition, the VNF Package Management System may be the component of the NFVO that is configured to on-board the VNF package artifacts from the VPAR file to components within the NFV system.

Reference will now be made in detail to exemplary embodiments of the presently disclosed subject matter, examples of which are illustrated in the accompanying drawings. Wherever possible, the same reference numbers will be used throughout the drawings to refer to the same or like parts. Various embodiments of the present subject matter are disclosed and described herein.

Figure 1:
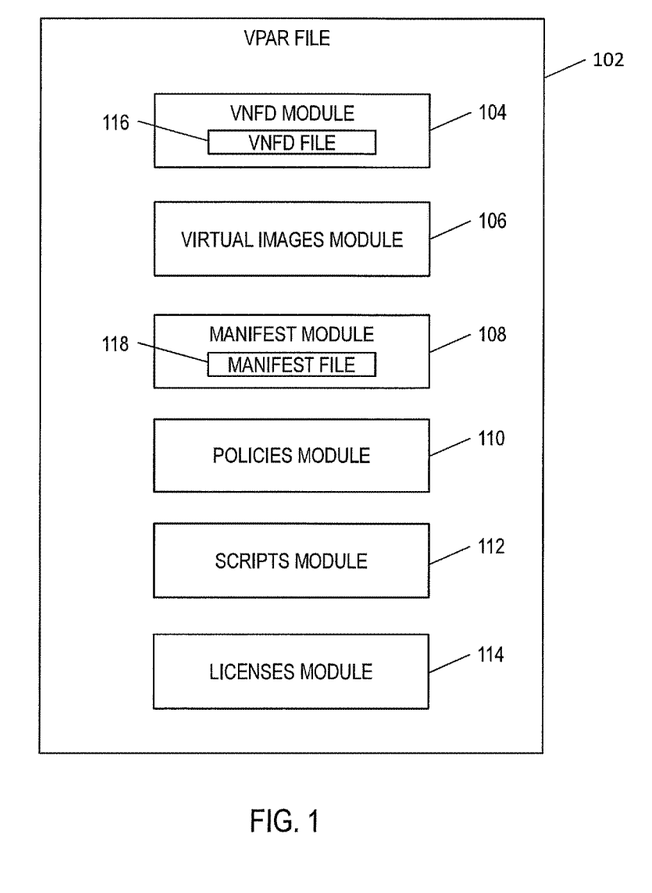
FIG. 1 is a block diagram of an exemplary virtualized network function package archive file according to an embodiment of the subject matter described herein.

FIG. 1 is a block diagram of an exemplary VPAR file according to an embodiment of the subject matter described herein. VPAR file 102 depicts a software archive file for organizing a complete VNF package that enables the package and its contents to be on-boarded and/or registered to a VNF catalog as well as some constituent parts being processed by different systems. In some embodiments, VPAR file 102 may utilize existing Java security mechanisms, such as digital certificates and Java manifest files. Further, the virtual images and/or scripts within the VPAR need not be Java executable software themselves.

In some embodiments, the VPAR file format may be based on a JAR archive format that handles the on-boarding of components and/or artifacts contained in the VNF package to NFV system elements (e.g., the VNF catalog or image repository). The VPAR file may include i) deployment artifacts for the VNF including the virtual images and ii) management artifacts for the configuration and lifecycle management of the VNF. Notably, the entire structure of a VNF package offering may remain intact in a sealed archive provided by VPAR file 102 that does not need to be change from initial on-boarding to termination of an executed VNF.

As shown in FIG. 1, VPAR file 102 includes a VNFD module 104, a virtual image module 106, a manifest module 108, a policies module 110, a scripts module 112, and/or a licenses module 114. In some embodiments, each of modules 106-114 comprises a directory within the VPAR file 102.

In some embodiments, VNFD module 104 may comprise a directory configured to store VNFD files and metadata that indicates which VNFDs are to be on-boarded to a NFV MANO system. For example, VNFD module 104 may comprise a "/vnfd directory" in VPAR file 102 that includes at least one VNFD file 116, which may be in any format. Further, the VNFD file(s) and the/vnfd directory within VPAR file 102 may utilize regular ASCII characters that are supported on all standard operating systems.

In some embodiments, VPAR file 102 includes at least one virtual image module 106 that may be configured to indicate what software images (e.g., VNF image files) need to be uploaded to an image repository in the NFV MANO system. Notably, a VNF package management system and/or a NFVO may be configured to upload a VNF image file to an image repository. Once a VNF image file is contained in the image repository, the file is accessible by a VIM. The VIM may be configured to utilize the stored VNF image file to subsequently deploy the virtual machines in an NFVI.

Likewise, VPAR file 102 may include at least one scripts module 112 that may be configured to function as a directory (i.e., a scripts directory) that contains a plurality of VNF lifecycle workflow scripts and configuration scripts. Notably, the lifecycle workflow scripts may be used to on-board or upload a VNFD to a NFV-MANO system for a VNF deployment. Similarly, configuration scripts may be configured to execute the VNFs contained in the VNF package. In some embodiments, the script files contained with scripts module 112 are configured to be executable in terms of file permissions. For example, the NFVO may access scripts module 112 and conduct a file permission check in order to execute any stored script file.

In some embodiments, a VNFD file stored in VNFD module 104 specifies the virtual data units (VDUs) associated with one or more constituent virtualized network function components (VNFCs). A VDU specified by a VNFD file may include information such as a number of virtual machines to be used for each version of the function, the interface and resource requirements (e.g., compute, storage, networking resource components) for each virtual machines, and reference(s) (e.g., hyperlink reference, universal resource identifier (URI) reference, etc.) to the virtual machine images to be loaded (e.g., references to either a directory path in the VPAR archive or a remote external source).

VPAR file 102 may further include a manifest module 108 (e.g., a manifest directory) that includes a listing of all files contained in VPAR file 102 as well as the metadata corresponding to VPAR file 102. For example, a manifest file in manifest module 108 may contain a reference (e.g., a logical address) for each the VNFD files contained in VPAR file 102. In some embodiments, manifest module 108 may include a signed .jar file. Manifest module 108 may also be configured to include i) a cryptographic hash or other authentication construct and/or ii) a checksum verification that can be utilized to check the integrity and/or validity of VPAR file 102.

In some embodiments, a manifest file 118 is located in a META-INF/MANIFEST.MF directory within VPAR file 102. Manifest file 118 may be a file containing information about the structure of other files within VPAR file 102. Further, applications that function with VPAR file 102 are configured to access the structure information contained in manifest file 118. Table 1 depicts an exemplary manifest file that illustrates the manifest key value workings. Notably, the example manifest file may be parsed by the NFVO and/or VNF package management system and access data presented as multiple <key>:<value> pairs (i.e., one key-value pair per line).

TABLE 1

Manifest-Version: 1.0
Archiver-Version: Plexus Archiver
Created-By: Apache Maven
Built-By: Kevin
Build-Jdk: 1.7.0_60
VNF-Package-ID: VNFP2234
VNF-Package-Version: 1.0
VNF-Package-Description: A short description of the VNF package
VNF-Descriptor-Name: Oracle CSM
VNF-Descriptor-Version: 1.0.2
VNF-Descriptor-Format: TOSCA
VNF-Package-External-Files: http://<path to server>/for/external/files/images/etc
VNF-Manager-Embedded: No In some embodiments, VPAR file 102 includes a module 106 to store software images. Notably, the software images are not mandatory for VNF package, but if supplied, the software images are stored in a virtual images directory (e.g., module 106). VPAR file 102 may further include a policies module 110 (e.g., a policy directory or policies directory) for containing policies relevant to the operation of the VNF package and a licenses module 114 (e.g., a licenses directory) for storing licenses for the use and operation of applications/functions provided by the associated VNF package(s).

Figure 2:
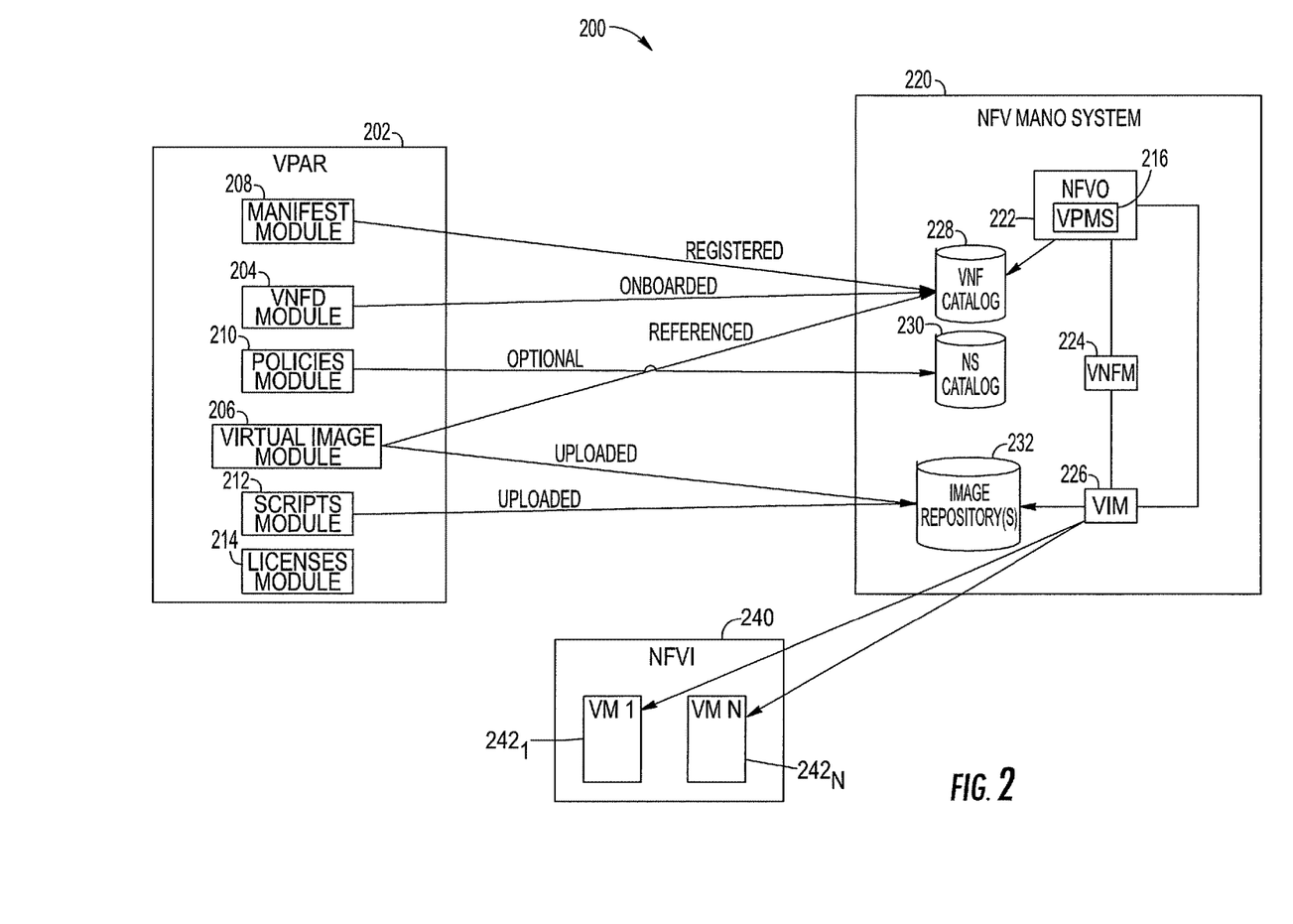
FIG. 2 is a diagram illustrating an exemplary system for on-boarding virtualized network function packages according to an embodiment of the subject matter described herein.

FIG. 2 is an exemplary depiction of the architectural framework of an NFV system and represents such a system at a functional and/or logical level and does not imply any specific implementation. For example, multiple functional blocks may be merged together thereby internalizing the reference point between them. For example, FIG. 2 depicts a NFV system 200 that includes an NFV MANO system 220 and an NFV infrastructure (NFVI) 240. As depicted in FIG. 2, NFV MANO system 220 comprises a plurality of sub-systems/elements including an NFVO 222, a VNFM 224, and a VIM 226. As described below, each of NFVO 222, a VNFM 224, and a VIM 226 may be embodied as a software module stored in a memory respectively hosted by a special purpose machine and subsequently executed by a processor of its special machine host. Alternatively, NFVO 222, a VNFM 224, and a VIM 226 may be stored in the same memory of the same special purpose machine. NFV MANO system 220 may further include a plurality of repositories, such as VNF catalog 228, network services (NS) catalog 230, an image repository 232, and/or the like. In some embodiments, network service (NS) catalog 230 may include a repository of all of the on-boarded network services. In some embodiments, NS catalog 230 may be configured to serve as a repository for all of the on-boarded network services. NS catalog 230 may also support the creation and management of the network services deployment templates, such as a network service descriptor (NSD), a virtual link descriptor (VLD), and a VNF forwarding graph descriptor (VNFFGD) via interface operations exposed by NFVO 222.

Generally, the deployment and operational behavior of each VNF is captured in a logical template called a virtualized network function descriptor (VNFD) file that is on-boarded to and stored in VNF catalog 228. The NFV-MANO system 220 may utilize a VNFD file to create instances of a virtual machine that embodies the VNF as well as manage the lifecycle of those virtual machine instances. A VNFD file may also have a one-to-one correspondence with a VNF package and as it fully describes the attributes and requirements required to implement such a VNF (e.g., via a virtual machine in NFVI 240). In some instances, NFVI resources are assigned to a VNF based on the requirements captured in the VNFD file, which contains resource allocation criteria.

In some embodiments, NFVO 222 includes a VNF package management system 216 that is configured to receive a VPAR file 202 (not unlike VPAR file 102 depicted in FIG. 1) that is submitted for on-boarding (e.g., from an external vendor). Upon receipt, NFVO 222 may be configured to conduct a number of operational processes on a VNF package and/or its artifacts included in VPAR file 202. For example, NFVO 222 may be configured to check/inspect the VNF package in VPAR file 202 for the existence of artifacts such as i) a VNFD module 204 comprising a VNFD directory containing one or more VNFD files and ii) a manifest module 208 comprising a manifest directory including a manifest module 208. Notably, NFVO 222 may process manifest module 208 and store manifest details in VNF catalog 228. Likewise, NFVO 222 may be configured to process VNFD files in VPAR file 202 and subsequently store the VNFD files in VNF catalog 228. NFVO 222 may be further configured to verify the authenticity of a VNFD residing in a VNFD directory using manifest file 208. Moreover, NFVO 222 may be configured to check the security status of a manifest file in manifest module 208. This security check validates VPAR file 202 and consequently serves to verify the security and integrity of the VNF package. Since there is no existing formally agreed-upon standard for the VNFD file and/or VNF package, the structure afforded by VPAR file 202 can facilitate the prompt location/access of the VNFD files included in the contained VNF package.

After processing the VNFD files(s) contained in VPAR file 202 as described above, NFVO 222 stores the VNFD file(s) in VNF catalog 228. In some embodiments, VNF catalog 228 may include a repository of all of the on-boarded (e.g., imported) VNF packages and functions as support for the creation and management of the VNF package (e.g., the VNFD, software images, manifest files, etc.) via interface operations exposed by the NFVO. Both NFVO 222 and VNFM 224 can query VNF catalog 228 for retrieving a VNFD to support different operations, such as validation, checking instantiation feasibility, and the like. Similarly, NFVO 222 may also store references (e.g., logical addresses or pointers) corresponding to VNF image files in the VNF catalog 228.

In some embodiments, NFVO 228 may also make any VNF image files contained in VPAR file 202 available to at least one VIM 226 by uploading the VNF image files (e.g., virtual machine image files) to image repository 232 from virtual image module 206 in VPAR file 202. Image repository 232 may include any data repository or store that is configured to contain software image files, such as VNF image files, received from a source external to NFVO MANO system 220 (e.g., from submitted VPAR files). Image repository 232 may be configured to be accessible by VIM 226 and/or VNFM 224.

In some embodiments, VIM 226 may be configured to control and manage the compute, storage, and network resources, within an operator's infrastructure domain. VIM 226 may be specialized in handling a certain type of resource or may be capable of managing multiple types of resources. Further, VIM 226 may be configured to acknowledge the uploading of the virtual machine image files to image repository 232. In some embodiments, NFVO 222 may also be configured to process the VNF image files by verifying their respective checksums and subsequently uploading the image files to the appropriate image repository 232 via a VIM API or other interface.

In some embodiments, NFVO 222 is configured to conduct the orchestration of NFVI resources across one or more VIMs. Although only one VIM 226 is depicted in FIG. 2, additional VIMs may be utilized without departing from the scope of the present subject matter. NFVO 222 may also be configured to conduct lifecycle management of network services as well as fulfilling network service (NS) orchestration functions via the utilization of VNFs. Similarly, NFVO 222 can be configured to manage NS deployment templates and packages. During the on-boarding of VNFs to NFV-MANO system 220, validation of VNF packages may be required. Moreover, NFVO 222 may be further configured to upload software images (e.g., VNF image files) that are contained in the VPAR file 202 for the different VNF components during the on-boarding of a VNF package to system 220.

NFVO 222 is further configured to conduct the management of the instantiation of at least one VNF manager (VNFM) 224 as well as the management of the instantiations of one or more VNFs (via coordination with the VNFMs). For example, VNFM 224 as shown in FIG. 2 may be configured to handle the lifecycle management of VNF instances running in NFVI 240. In particular, each VNF instance may be used to execute at least one virtual machine (e.g., at least one of virtual machines (VMs) $242_{1 \ldots N}$) that corresponds to a VNFM. For example, VNFM 224 may be assigned the management of a single VNF instance responsible for facilitating and/or deploying a VM 242. Alternatively, VNFM 224 may be assigned with the management of multiple VNF instances of the same type or of different types.

In some embodiments, NFVO 222 may also access scripts module 212 to obtain scripts and/or script files contained within VPAR file 202. Notably, scripts included in VPAR file 202 may be uploaded to image repository 232. Once stored in repository 232, VIM 226 may access the scripts for executing virtual machines in NFVI 240 in the event corresponding virtual machine images are initiated (e.g., booted). The number of virtual machines and other resources depends on the VNF metadata included in the VNFD file contained in the VNFD directory (e.g., VNFD module 204).

Figure 3:
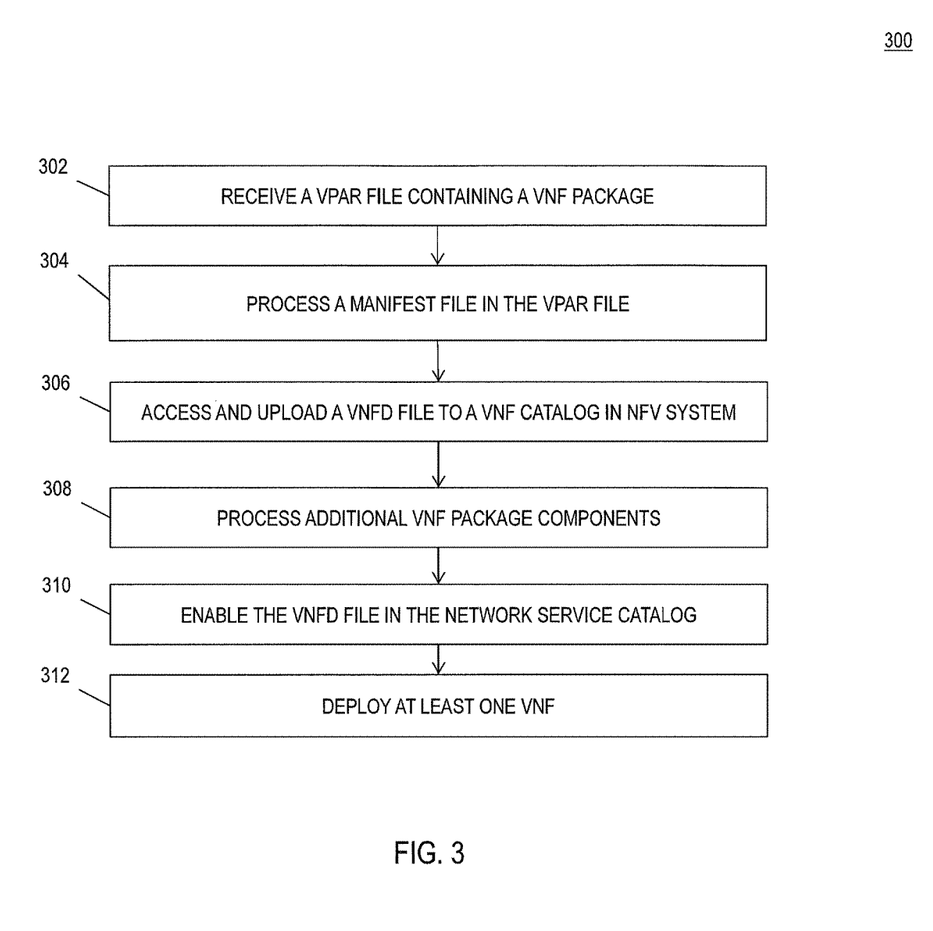
FIG. 3 is a flow chart illustrating an exemplary process for on-boarding virtualized network function packages according to an embodiment of the subject matter described herein.

FIG. 3 is a flow chart illustrating an exemplary method 300 for on-boarding VNF packages in a NFV system utilizing a predefined format according to an embodiment of the subject matter described herein. In step 302, a VPAR file including a VNF package is received. In some embodiments, the VPAR file is submitted to and received by a VNF package management system included within an NFVO in an NFVO MANO system.

In step 304, a manifest directory is located. In some embodiments, the NFVO (and/or the VNF package management system) attempts to locate a META-IF/MANIFEST.MF file in a manifest module or directory included in the received VPAR file. If the manifest file is not located, processing of the VPAR file ceases. Otherwise, the NFVO processes the signature and/or certificates contained in the VPAR file. Additionally, NFVO may conduct other security checks and measures, such as crosschecking/comparing digests or other stored files against a digest of a trusted manifest file. If the VPAR file's certificate is deemed to be valid, the NFVO can determine whether the certificate is expired (e.g., comparing the "to" and "from" dates included in the certificate against the system date/time stamp).

In step 306, the VNFD file is on-boarded to the VNF catalog. In some embodiments, the NFVO may process key value pairs contained in the manifest file in a top-down order and can subsequently examine whether a VNF package identifier that uniquely identifies the contained VNF package (and corresponding artifacts) has been on-boarded to the VNF catalog in a previous instance. In the event the VNF package identifier/version is identical to the version number existing in the VNF catalog, the user can be prompted to confirm whether or not to continue with the processing of the VNF package (as this action will overwrite the existing VNF package in the VNF catalog). If an identifier corresponding to the VNF package version is greater than the version number stored in the VNF catalog, the NFVO uses an "update package" catalog API rather than an "add package" catalog API to update the VNF package data. The NFVO then locates at least one VNFD file contained within the VNFD directory (e.g., a VNFD module included in the VPAR file). Upon locating the VNFD file, the NFVO uploads the VNFD file to a VNF catalog maintained in the NFVO MANO system.

In step 308, additional VNF package components are located. In some embodiments, the NFVO loads the virtual machine images, policies, and/or scripts related to the given VNFD file. For example, the NFVO further locates the virtual images folder and inspects the image files contained within. Notably, the NFVO may be configured to match these VNF image files with the VNF-package-external-files key contained in the manifest directory/module. If the manifest directory/module points to an external reference, then that location is queried and/or accessed in order to access and acquire the VNF image file. The image reference may also be added to the VNFD file entry in the VNF catalog. The NFVO then locates the image repository appropriate for the VNF package based on NFVO's catalog default settings. In such an event, the VNF image file is uploaded an image repository (e.g. OpenStack's Image Service API (Glance)) in the NFV MANO system.

Further, the NFVO made process any policy by reviewing the policy files included in the policies module/directory of the VPAR file and uploading the policy files to the VNF catalog. In addition, the NFVO may similarly process any scripts or script files by reviewing the script files in the scripts module/directory and subsequently uploading the script files to the VNF catalog.

In step 310, the VNFD file is enabled in the network service catalog. In some embodiments, the NFVO is configured to enable the VNFD file after the on-boarding activities are completed. For example, the VNFD may be designated by the NFVO to be enabled in the NS catalog.

In step 312, VNFs are deployed. In some embodiments, VNF virtual machines corresponding to the enabled VNFDs are executed. For example, virtual machines executing the VNFs may be instantiated, scaled, or terminated using the declarations within the associated and respective VNFD files. Notably, running instances of virtual machines executing VNFs can be orchestrated by a VIM using a VNF's associated infrastructure scripts and virtual machine images.

Figure 4:
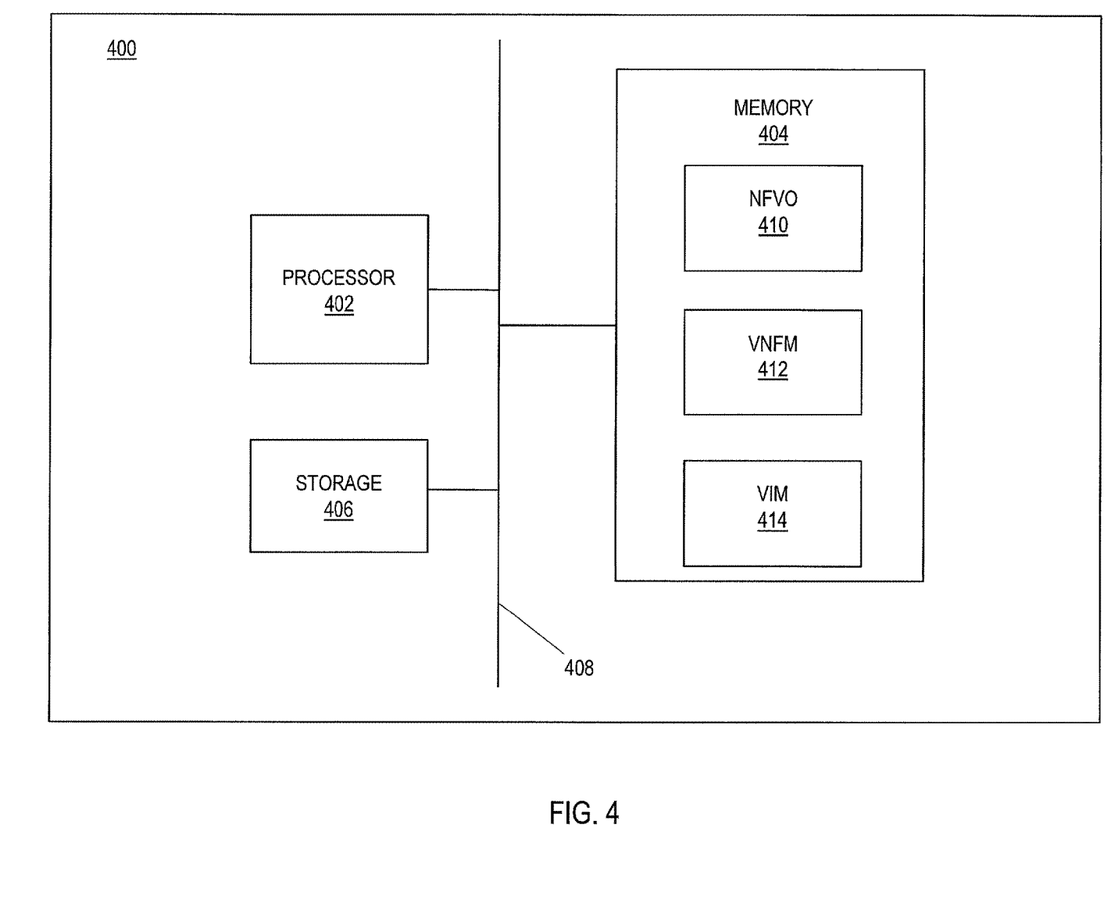
FIG. 4 is a block diagram of a special purpose computer system suitable for use in performing the functions described herein.

FIG. 4 depicts a high level block diagram of a special purpose computer system suitable for use in performing the functions described herein. As depicted in FIG. 4, system 400 comprises a processor 402, a memory 404, a storage device 406, and communicatively connected via a system bus 408. In some embodiments, processor 402 can comprise can comprise a microprocessor, central processing unit (CPU), or any other like hardware based processing unit. In some embodiments, each of NFVO module 410, VNFM module 412, and VIM module 414 can be stored in memory 404, which can comprise random access memory (RAM), read only memory (ROM), optical read/write memory, cache memory, magnetic read/write memory, flash memory, or any other non-transitory computer readable medium. In some embodiments, processor 402 and memory 404 can be used to execute and manage the operation for each of each of NFVO module 410, VNFM module 412, and VIM module 414. In some embodiments, storage device 406 can comprise any storage medium or storage unit that is configured to store data accessible by processor 402 via system bus 408. Exemplary storage devices can comprise one or more local databases hosted by system 400.

It should be noted that processing each of NFVO module 410, VNFM module 412, and VIM module 414, and/or functionality described herein (e.g., respectively performing the functions associated with NFVO 222, VNFM 224, and VIM 216 described above and in FIG. 2) can constitute a special purpose computing system. Further, system comprising the NFVO module 410, VNFM module 412, and VIM module 414, and/or functionality described herein can improve the technological field of NFV management and orchestration by deploying virtualized network functions in an associated virtualized environment with greater efficiency. The present subject matter further affords a formal VNF packaging structure that enables the automation of the VNF lifecycle without special coding or manual intervention for basic VNF package processing and manipulation.

It will be understood that various details of the subject matter described herein may be changed without departing from the scope of the subject matter described herein. Furthermore, the foregoing description is for the purpose of illustration only, and not for the purpose of limitation, as the subject matter described herein is defined by the claims as set forth hereinafter.

What is claimed is:

1. A method for deploying a virtualized network function (VNF) in accordance with VNF package archive (VPAR) file, the method comprising:

receiving, by a network function virtualization orchestrator (NFVO) including a VNF package management system located within a network functions virtualization (NFV) system, a VPAR file containing at least a virtualized network function descriptor (VNFD) directory comprising a VNFD file, a virtual image directory comprising an associated VNF image file, a manifest directory comprising a manifest file, and a scripts directory comprising script files, wherein each of the directories are organized in the VPAR file in a predefined structure that is recognized by and processed individually by the VNF package management system;

locating and parsing the manifest file in the manifest directory included in the received VPAR file, wherein the manifest file contains information about the structure of other files within VPAR file;

accessing the VNFD file in the VNFD directory contained within the VPAR file in accordance with the predefined structure;

uploading the VNFD file from the VNFD directory to a VNF catalog in the NFV system;

accessing, after uploading the VNFD file, the virtual image directory and the scripts directory in the VPAR file in accordance with the predefined structure to obtain the associated VNF image file and the script files, wherein the uploaded VNFD file includes a virtual data unit that specifies a directory path in the VPAR file that references the associated VNF image file;

uploading the associated VNF image file from the virtual image directory and the script files from the script directory to an image repository in the NFV system, wherein the image repository is separate from a virtualized infrastructure manager (VIM);

enabling by the NFVO, the VNFD file in a network service catalog;

accessing by the VIM, the associated VNF image file and the script files stored in the image repository; and deploying by the VIM, in a virtual environment associated with the NFV system, one or more VNFs in accordance with contents of the uploaded VNFD file, uploaded script files, and the associated VNF image file, wherein a number of virtual machines executing the one or more VNFs is instantiated, scaled, or terminated using the enabled VNFD file, and wherein the number of virtual machines executing the one or more VNFs is orchestrated by the VIM using the script files and the associated VNF image file.

2. The method of claim 1 comprising accessing a manifest file in a manifest directory contained within the VPAR file to determine if the VNFD file has been previously uploaded to the NFV system.

3. The method of claim 2 wherein the manifest file contains a reference for each of the VNFD files contained in the VPAR file.

4. The method of claim 1 wherein each of the VNFD file and the VNF image file is stored in the VPAR file in a predefined format.

5. The method of claim 4 wherein the predefined format is compatible with multiple NFV systems.

6. The method of claim 1 wherein the VPAR file includes the VNFD directory, a virtual image directory, a manifest directory, a scripts directory, a policy directory, and a licenses directory.

7. The method of claim 1 wherein the VNF image file from either the VPAR file or an external source is uploaded to an image repository in the NFV system.

8. A system for deploying a virtualized network function (VNF) in accordance with VNF package archive (VPAR) file, the system comprising:
a processor;
a memory communicatively coupled to the processor via a system bus;
a network function virtualization orchestrator (NFVO) stored in the memory and including a VNF package management system located within a network functions virtualization (NFV) system configured to:
receive a VPAR file containing at least a virtualized network function descriptor (VNFD) directory comprising a VNFD file, a virtual image directory comprising an associated VNF image file, a manifest directory comprising a manifest file, and a scripts directory comprising script files, wherein each of the directories are organized in the VPAR file in a predefined structure that is recognized by and processed individually by the VNF package management system,
locate and parse the manifest file in the manifest directory included in the received VPAR file, wherein the manifest file contains information about the structure of other files within VPAR file,
access the VNFD file in the VNFD directory contained within the VPAR file in accordance with the predefined structure,
upload the VNFD file from the VNFD directory to a VNF catalog in the NFV system,
access, after uploading the VNFD file, the virtual image directory and the scripts directory in the VPAR file in accordance with the predefined structure to obtain the associated VNF image file and the script files, wherein the uploaded VNFD file includes a virtual data unit that specifies a directory path in the VPAR file that references the associated VNF image file,
upload the associated VNF image file from the virtual image directory and the script files from the script directory to an image repository in the NFV system, and
enable the VNFD file in a network service catalog; and
a virtualized infrastructure manager (VIM) stored in the memory and configured to:
access the associated VNF image file and the script files stored in the image repository; and
deploy, in a virtual environment associated with the NFV system, one or more VNFs in accordance with the contents of the uploaded VNFD file, the uploaded script files, and the associated VHF image file, wherein a number of virtual machines executing the one or more VNFs is instantiated, scaled, or terminated using the enabled VNFD file, and wherein the number of virtual machines executing the one or more VNFs is orchestrated by the VIM using the script files and the associated VHF image file, wherein the image repository is separate from the VIM.

9. The system of claim 8 comprising accessing a manifest file in a manifest directory contained within the VPAR file to determine if the VNFD file has been previously uploaded to the NPV system.

10. The system of claim 9 wherein the manifest file contains a reference for each of the VNFD files contained in the VPAR file.

11. The system of claim 8 wherein each of the VNFD file and the VHF image file is stored in the VPAR file in a predefined format.

12. The system of claim 11 wherein the predefined format is compatible with multiple NFV systems.

13. The system of claim 8 wherein the VPAR file includes the VNFD directory, a virtual image directory, a manifest directory, a scripts directory, a policy directory, and a licenses directory.

14. The system of claim 8 wherein the VNF image file from either the VPAR file or an external source is uploaded to an image repository in the NFV system.

15. A non-transitory computer readable medium having stored thereon executable instructions that when executed by a processor of a computer cause the computer to perform steps for deploying a virtualized network function (VNF) in accordance with VNF package archive (VPAR) file, the steps comprising:
receiving, by a network function virtualization orchestrator (NFVO) including a VNF package management system located within a network functions virtualization (NFV) system, a VPAR file containing at least a virtualized network function descriptor (VNFD) directory comprising a VNFD file, a virtual image, directory comprising an associated VNF image file, a manifest directory comprising a manifest file, and a scripts directory comprising script files, wherein each of the directories are organized in the VPAR file in a predefined structure that is recognized by and processed individually by the VNF package management system;
locating and parsing the manifest file in the manifest directory included in the received VPAR file, wherein the manifest file contains information about the structure of other files within VPAR file;
accessing the VNFD file in the VNFD directory contained within the VPAR file;
uploading the VNFD file from the VNFD directory to a VNF catalog in the NFV system;
accessing, after uploading the VNFD file, the virtual image directory and the scripts directory in the VPAR file in accordance with the predefined structure to obtain the associated VNF image file and the script files, wherein the uploaded VNFD file includes a virtual data unit that specifies a directory path in the VPAR file that references the associated VNF image file;
uploading the associated VNF image file from the virtual image directory and the script files from the script directory to an image repository in the NFV system, wherein the image repository is separate from a virtualized infrastructure manager (VIM);
enabling by the NFVO, the VNFD file in a network service catalog;
accessing by the VIM, the associated VNF image file and the script files stored in the image repository; and
deploying by the VIM, in a virtual environment associated with the NFV system, one or more VNFs in accordance with the contents of the uploaded VNFD file, uploaded script files, and the associated VNF image file, wherein a number of virtual machines executing the one or more VNFs is instantiated, scaled, or terminated using the enabled VNFD file, and wherein the number of virtual machines executing the one or more VNFs is orchestrated by the VIM using the script files and the associated VNF image file.

16. The computer readable medium of claim 15 comprising accessing a manifest file in a manifest directory contained within the VPAR file to determine if the VNFD file has been previously uploaded to the NFV system.

17. The computer readable medium of claim 16 wherein the manifest file contains a reference for each of the VNFD files contained in the VPAR file.

18. The computer readable medium of claim 15 wherein each of the VNFD file and the VNF image file is stored in the VPAR file in a predefined format.

19. The computer readable medium of claim 18 wherein the predefined format is compatible with multiple NFV systems.

20. The computer readable medium of claim 15 wherein the VPAR file includes the VNFD directory, a virtual image directory, a manifest directory, a scripts directory, a policy directory, and a licenses directory.

\* \* \* \* \*

UNITED STATES PATENT AND TRADEMARK OFFICE
CERTIFICATE OF CORRECTION

PATENT NO. : 10,148,731 B2  
APPLICATION NO. : 14/788133  
DATED : December 4, 2018  
INVENTOR(S) : McDonnell Page 1 of 1

It is certified that error appears in the above-identified patent and that said Letters Patent is hereby corrected as shown below:

In the Claims

In Column 11, Line 62, in Claim 8, delete "VHF" and insert -- VNF --, therefor.

In Column 12, Line 1, in Claim 8, delete "VHF" and insert -- VNF --, therefor.

In Column 12, Line 7, in Claim 9, delete "NPV" and insert -- NFV --, therefor.

In Column 12, Line 12, in Claim 11, delete "VHF" and insert -- VNF --, therefor.

In Column 12, Line 34, in Claim 15, delete "image," and insert -- image --, therefor.

Signed and Sealed this  
Tenth Day of December, 2019

Andrei Iancu  
*Director of the United States Patent and Trademark Office*